(12) United States Patent
Talagala et al.

(10) Patent No.: US 7,565,446 B2
(45) Date of Patent: Jul. 21, 2009

(54) METHOD FOR EFFICIENT DELIVERY OF CLUSTERED DATA VIA ADAPTIVE TCP CONNECTION MIGRATION

(75) Inventors: Nisha Talagala, Livermore, CA (US); Martin Patterson, Menlo Park, CA (US)

(73) Assignee: Gear Six, Inc., Menlo Park, CA (US)

( * ) Notice: Subject to any disclaimer, the term of this patent is extended or adjusted under 35 U.S.C. 154(b) by 147 days.

(21) Appl. No.: 11/845,679

(22) Filed: Aug. 27, 2007

(65) Prior Publication Data

US 2009/0059862 A1 Mar. 5, 2009

(51) Int. Cl.
G06F 15/16 (2006.01)
H06W 4/00 (2006.01)
(52) U.S. Cl. .............................. 709/238; 370/331; 710/5
(58) Field of Classification Search ......... 709/238–245, 709/207; 370/328–331; 710/5–6
See application file for complete search history.

(56) References Cited

U.S. PATENT DOCUMENTS

| 6,826,613 | B1 | 11/2004 | Wang et al. |
| 7,000,027 | B2 * | 2/2006 | Hensbergen ................. 709/239 |
| 7,245,917 | B2 * | 7/2007 | Chiueh ......................... 455/442 |
| 2001/0036834 | A1 * | 11/2001 | Das et al. ..................... 455/458 |
| 2002/0026527 | A1 * | 2/2002 | Das et al. ..................... 709/245 |
| 2006/0092878 | A1 * | 5/2006 | Shirota et al. ............... 370/331 |

* cited by examiner

Primary Examiner—Christopher B Shin
(74) Attorney, Agent, or Firm—Pillsbury Winthrop Shaw Pittman LLP (57) ABSTRACT

The present invention relates generally to a method for efficient I/O handling in a cluster-based architecture. According to one aspect, the invention enables efficient scheduling of TCP connection migrations within a cluster. According to another aspect, the invention enables I/Os performed as TCP handoff operations to coexist on the same TCP/IP connection with I/Os performed as remote operations.

20 Claims, 6 Drawing Sheets

METHOD FOR EFFICIENT DELIVERY OF CLUSTERED DATA VIA ADAPTIVE TCP CONNECTION MIGRATION

FIELD OF THE INVENTION

The present invention relates to data storage, and more particularly to a method for highly efficient delivery of data via adaptive connections to nodes in a cluster based architecture.

BACKGROUND OF THE INVENTION

Figure 1:
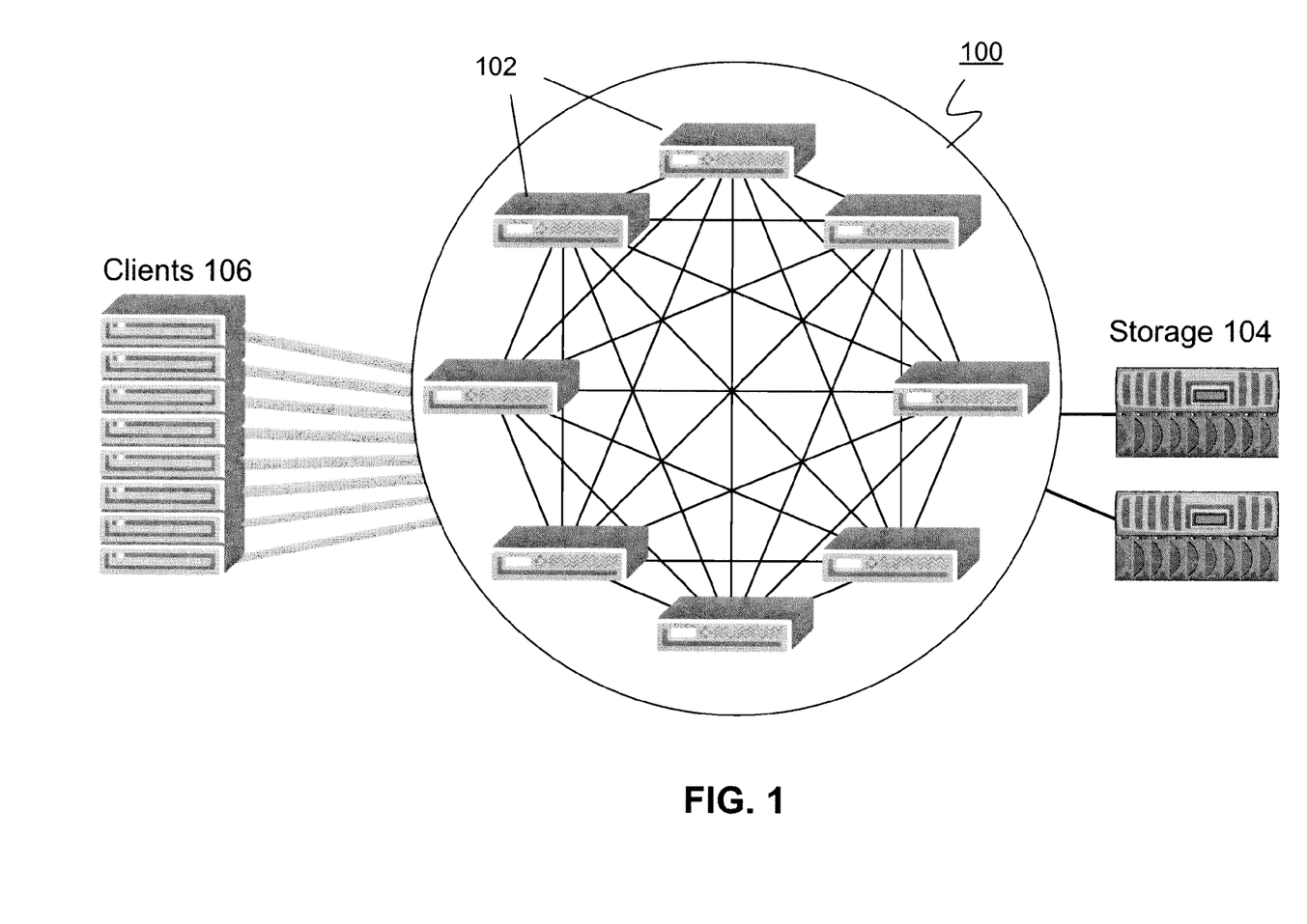
FIG. 1 is a block diagram illustrating certain aspects of conventional cluster-based architectures.

Cluster based architectures such as that shown in FIG. 1 are commonly used for high performance I/O and storage systems. In such architectures, each "node" 102 in the cluster 100 provides an access point into the storage 104, and storage content is cached and distributed across nodes 102 according to some placement method. Co-pending U.S. application Ser. No. 11/365,474, commonly owned by the present assignee and incorporated by reference herein in its entirety, dramatically advanced the state of the art by providing a high-performance and highly-scalable caching solution with a cluster-based architecture. However, certain problems remain.

For example, in a client-server or initiator-target model (for example a NAS filer), it is considered desirable to allow a client 106 to connect to any node and be able to access any content from storage 104 regardless of its placement among the nodes in cluster 100.

A straightforward method for handling such I/O is for the cluster node 102 that has the TCP connection with the client 106 to forward the I/O request to the cluster node 102 where the data is placed, with the reply data sent back to the receiving node 102 and from there to the client 106. This approach is sometimes referred to as "remote operations." While simple, this approach requires data copies to be moved between cluster nodes, limiting performance for large I/O operations.

An alternate method used in IP based clusters 100 is sometimes referred to as a TCP/IP "handoff operation," in which the TCP/IP connection is migrated to the node 102 actually executing the I/O. This approach has the advantage that reply data is then sent directly to the client 106 via a single cluster node 102. However, moving a TCP/IP connection is an expensive operation, and can also limit performance, particularly for small I/O requests.

Accordingly, a need remains in the art for more efficient delivery of data in a cluster-based architecture.

SUMMARY OF THE INVENTION

The present invention relates generally to a method for efficient I/O handling in a cluster-based architecture. According to one aspect, the invention enables efficient scheduling of TCP connection migrations within a cluster. According to another aspect, the invention enables I/Os performed as TCP handoff operations to coexist on the same TCP/IP connection with I/Os performed as remote operations.

In furtherance of these and other aspects, a method according to the invention includes receiving a network connection at a first node of a storage cluster, receiving a first I/O request at the first node via the connection, processing the first I/O request at the first node, receiving a second I/O request at the first node via the connection, forwarding the second I/O request to a second node of the storage cluster, processing the second I/O request at the second node while maintaining the network connection at the first node, and migrating the connection to the second node after completing the processing of the first I/O request at the first node and after forwarding the second I/O request to the second node. In additional furtherance of these and other aspects, another method according to the invention includes receiving a network connection at a first node of a storage cluster, receiving a first I/O request at the first node via the connection, processing the first I/O request at the first node, receiving a second I/O request at the first node via the connection, determining whether to handoff the second I/O request to a second node of the storage cluster, if the determination is to handoff the second I/O request: processing the second I/O request at the second node, and migrating the connection to the second node after completing the processing of the first I/O request at the first node and after forwarding the second I/O request to the second node, and if the determination is to not handoff the second I/O request: processing the second I/O request at the second node, and forwarding results of processing the second I/O request to the first node.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such.

Further, the present invention encompasses present and future known equivalents to the known components referred to herein by way of illustration.

Figure 2:
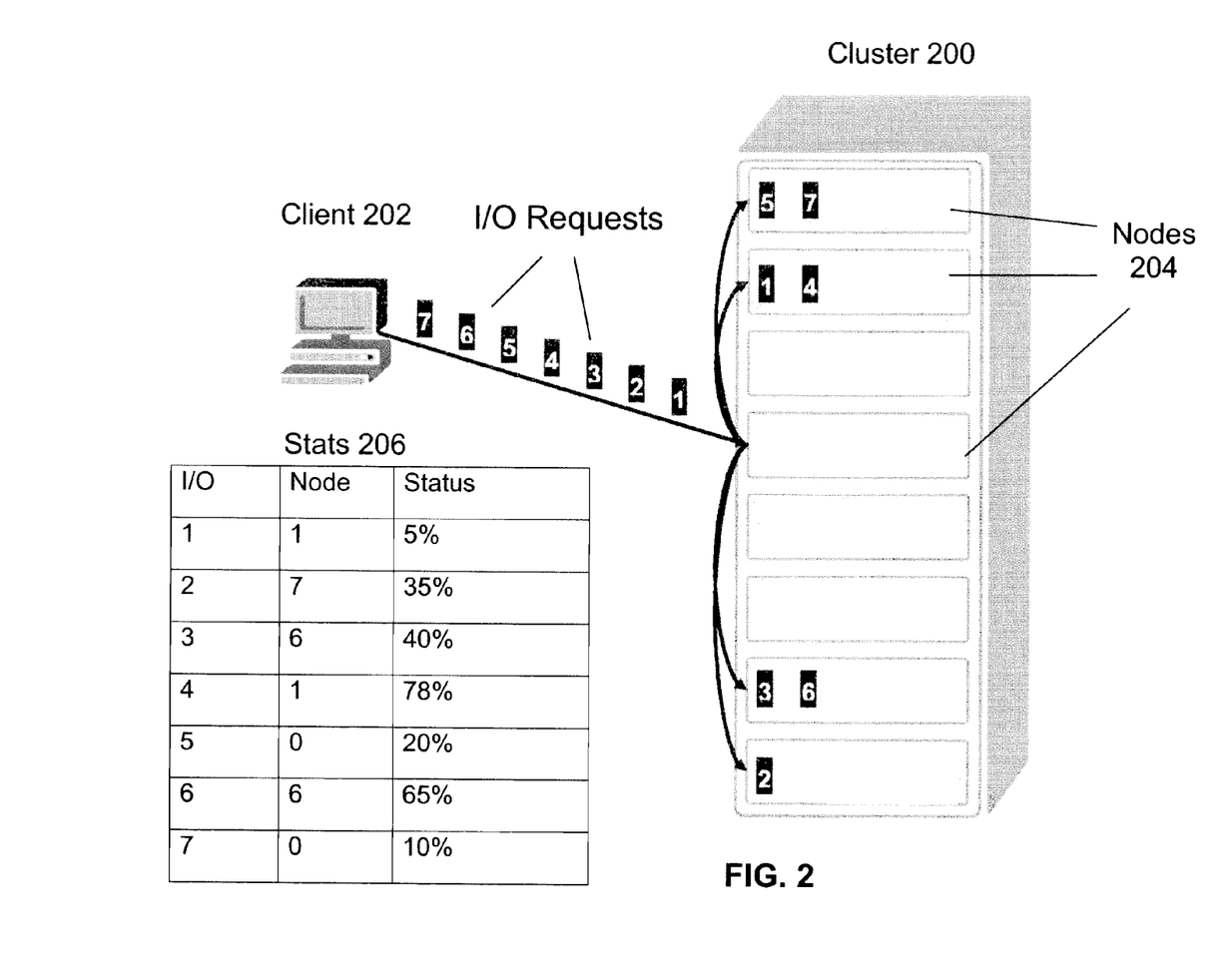
FIG. 2 is a block diagram illustrating certain connection migration scheduling aspects of the invention.

An example method of handling I/O requests according to some general aspects of the invention is illustrated in FIG. 2. When a client 202 sends a series of I/O requests, the receiving cluster node 204, if necessary, forwards each request to a respective node 204 that is responsible for its execution using a directory or map, for example. The I/O requests are also logged into a set of statistics 206 that is continuously maintained by all the nodes in the cluster 200 for the particular TCP/IP connection related to this client and set of requests. All incoming I/O requests for the connection are continuously distributed in this manner so that they can be processed in parallel.

When a cluster node 204 receives such a forwarded request, it will immediately begin to process the I/O and place the result in a deferred queue. At some point, a connection migration will be scheduled, transferring the TCP/IP connection to the remote node 204. Once the remote node 204 receives the TCP/IP connection, it can then send directly to the client all the replies it has processed.

According to certain aspects explained in more detail below, the TCP connection migration is scheduled between nodes 204 based on the accumulated statistics of pending requests at each node. As such, the cost of a TCP connection move can be amortized over multiple I/O requests, resulting in greater overall I/O throughput. For example, node 0 in FIG. 2 handles two separate requests 5 and 7, and when it gets the connection (e.g. when node 0 has completed queueing 100% of the data for both of the requests) it will send data corresponding to both requests 5 and 7 to client 202, thus eliminating the need to migrate the TCP connection to this node multiple times.

Figure 3:
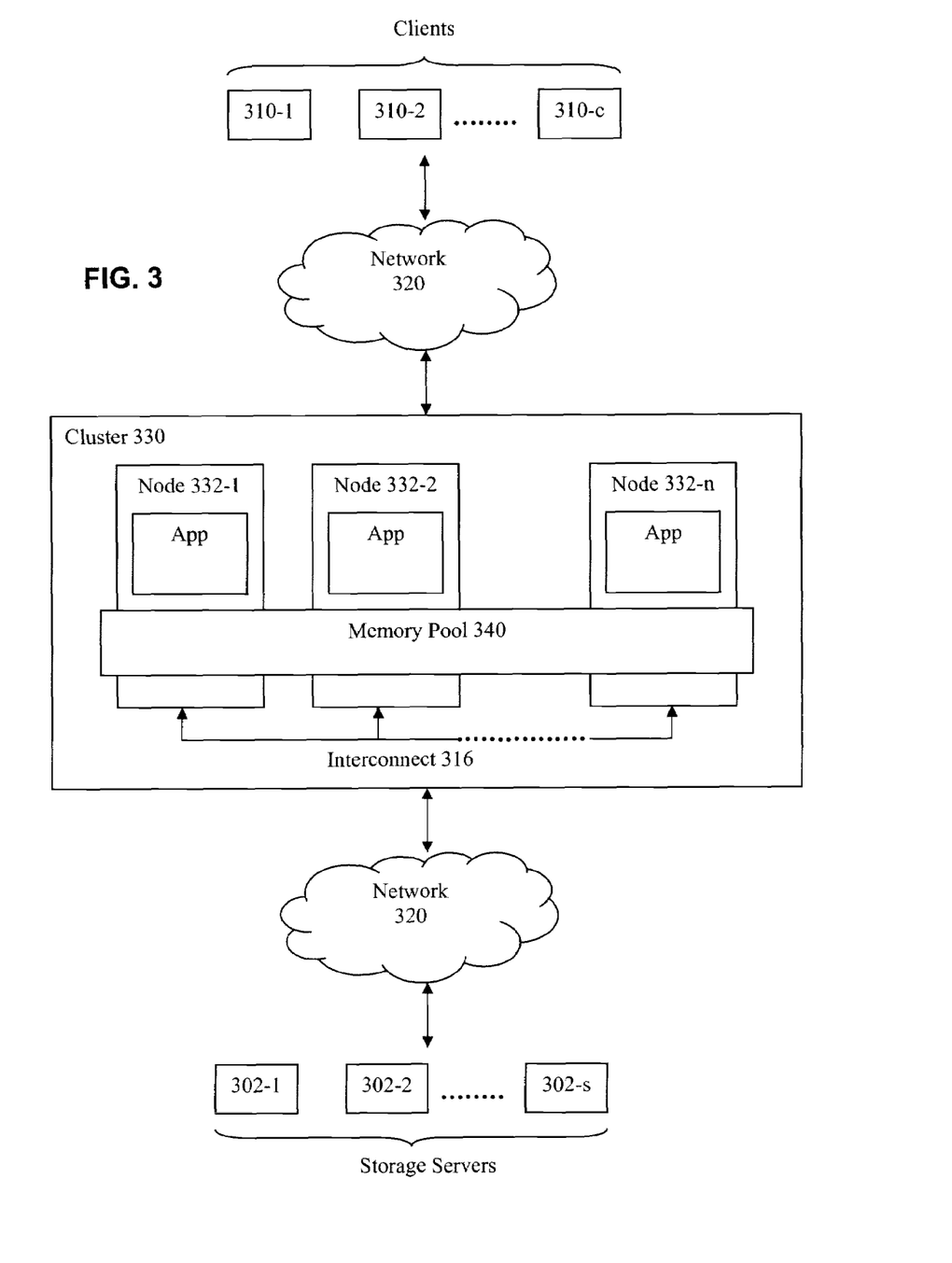
FIG. 3 is a block diagram illustrating an example architecture implementation of the present invention.

FIG. 3 illustrates an example implementation of the above and other aspects of the invention. In this example implementation, the present invention greatly accelerates handling of I/O requests from clients 310 by a cluster 330 of RAM-based nodes 332 interposed in the network data path 320 between storage servers 302 and clients 310. It should be noted, however, that although network elements and protocols can be used to implement the data path, certain of servers 302 and/or clients 310 need not be remotely located from either each other or cluster 330. Moreover, additional networks and/or network data paths may be interposed between clients 310, cluster 330 and/or servers 302.

Network data path 320 is an Ethernet in a NAS example, or a Fibre Channel in a SAN example. Hardware from Fibre Channel vendors including Cisco, Emulex, Brocade, McData, QLogic, LSI Logic, and Vixel can be used in a Fibre Channel example. As mentioned above, other types of wired and wireless networks and connections, as well as combinations of disparate types of networks, are possible.

Storage servers 302 are typically implemented by NFS server processes hosted by NAS filers such as the FAS 900 series from Network Appliance, for example. In another example storage servers 302 are hosted by SAN products such as the Symmetrix DMX series from EMC Corporation. It should be noted that although a plurality of servers are shown, there may only be one. It should be further noted that servers 302 may by hosted by combinations of different types of server devices (e.g. some of both NAS and SAN).

Clients 310 are typically implemented by NFS client processes hosted by compute servers such as high-performance servers running OLTP, batch processing, and other intensive operations under Apple OS X, AIX, Solaris, Linux, and Windows environments, for example. One example of compute servers that can be used include the DL145 from Hewlett Packard.

Cluster 330 contains functionality for recognizing and fulfilling requests for reading and writing data between stores 302 and clients 310. As further shown in FIG. 3, in this example, cluster 330 is comprised of a cluster of nodes 332-1 to 332-*n*. The nodes are interconnected by a standard interconnect 316, for example Gigabit Ethernet, which is used to exchange management and control information between nodes 332, as will become more apparent below. It should be noted that the connection migration aspects of the invention will be described below in connection with replies to read I/O requests from clients 310, the invention can be applied write and other I/O requests as well. It should be further noted that, although the techniques of the invention will be described in connection with a preferred embodiment of storage architectures communicating over protocols such as TCP/IP, the invention is not limited to these underlying protocols, and can be extended to other architectures and other connection oriented protocols (as long as there is some method of connection migration).

In one example, nodes 332 are comprised of 64-bit blade servers such as ScaleOut series blades from Rackable Systems, each having 32 GBytes of system memory (e.g. RAM). The memories of the individual blades are combined together in a manner such as that described in co-pending U.S. application Ser. No. 11/365,474 to form a single large (e.g. up to 5TB) and scalable memory pool 340. It should be noted that nodes 332 and/or clusters of elements need not be implemented using exactly the same type of blade server or other computing element, as long as they are capable of supporting and/or executing an application as described below.

Figure 4:
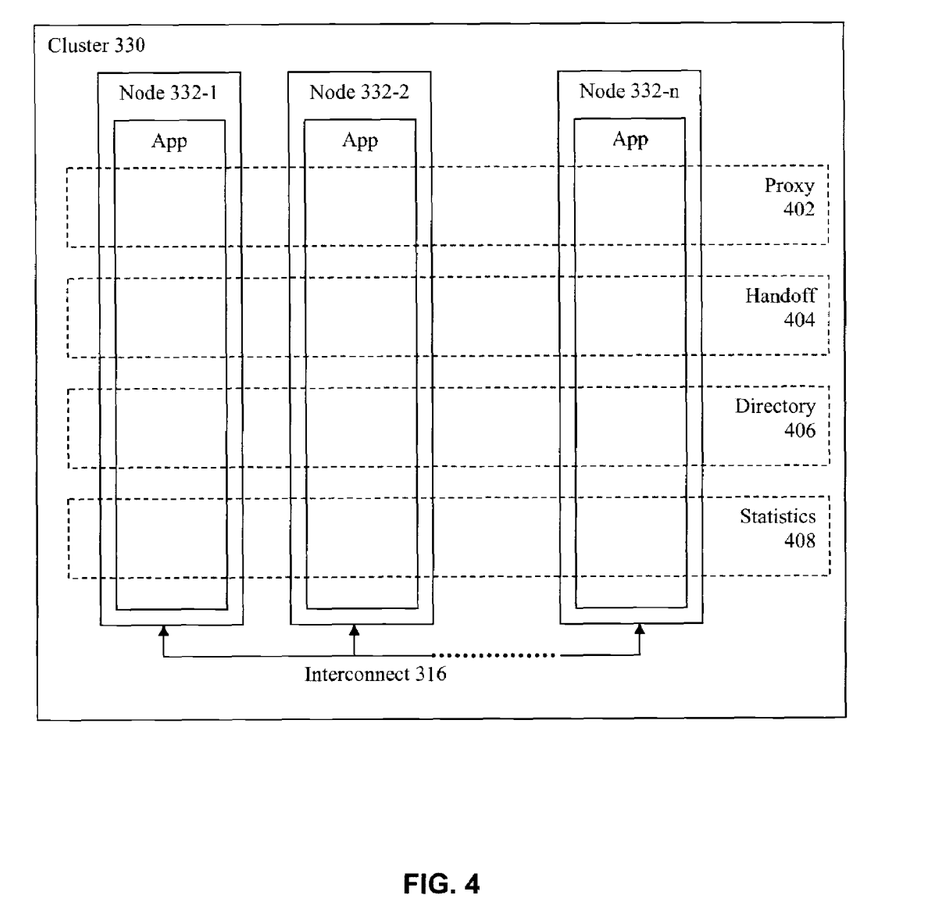
FIG. 4 is a block diagram illustrating an example implementation of a cluster according to aspects of the invention.

More particularly, as shown in FIG. 3, each node 332 further includes a common custom application. An example implementation of this custom application is illustrated in FIG. 4. As illustrated, each application communicates with other applications via interconnect 316 to thereby together implement a proxy 402, a connection handoff mechanism 404, a global directory 406 and connection statistics 408. In one example implementation, the application executes in an embedded Linux or VxWorks environment. Those skilled in the art will be able to understand how to implement the functionality of proxy 402, handoff mechanism 404, global directory 406 and statistics 408 in such an environment after being taught by the example descriptions below. It should be noted that nodes 332 can contain additional functionality and components not shown in FIGS. 3 and 4, including both conventional and proprietary functionality and components. However, such additional functionality and components are not shown or described in detail herein for clarity of the invention.

In one example, the proxy 402 implemented by the application incorporates well-known virtual IP addresses and proxy server techniques to intercept and, if possible, fulfill data requests from clients 310 to servers 302. However, according to an aspect of the invention as will be described in more detail below, the physical node 332 that handles any given request (or any portion thereof) in a given client connection is determined by reference to the global directory 406, and the possible migration of connections between nodes is handled by connection handoff mechanism 404. According to another aspect, the proxy includes support for one or more industry standard storage protocols (such as NFS, CIFS, Fibre Channel) and is implemented as a "bump in the wire" tee. The proxy also handles communications from servers back to clients.

For example, the applications running in all nodes 332 share a single virtual IP address for use of the cluster 330 as a proxy server, and clients 310 are configured to send data requests destined for one of servers 302 to this IP address. The proxy 402 distributed across all nodes 332 monitors the requested connection between the specific client 310 and server 302 associated with each connection. When one of nodes 332 starts communicating with a client 310 using the virtual IP address, and it is determined by handoff mechanism 404 that another node 332 should instead handle communications (e.g. according to accumulated statistics 408 as will be described in more detail below), that node takes over the network connection (e.g. by transparently migrating the connected TCP endpoint from one node 332 to the other node 332 without interaction on behalf of the client). This allows the other node 332 to directly deliver its data into the network stream. It should be noted that, in this example, applications may communicate among themselves to determine the default blade at any given point in time.

According to aspects of the invention mentioned above, when a connection with client 310 contains multiple I/O requests, a novel approach is taken that contrasts with conventional techniques. For a given TCP connection, rather than wait for all the requests to be received and then sequentially determining how to handle each request, each individual request is immediately forwarded to the appropriate node using information in directory 406. Each individual request is also logged in statistics 408, and handoff mechanism 404 determines which node 332 should handle a TCP connection at any given time.

Figure 5:
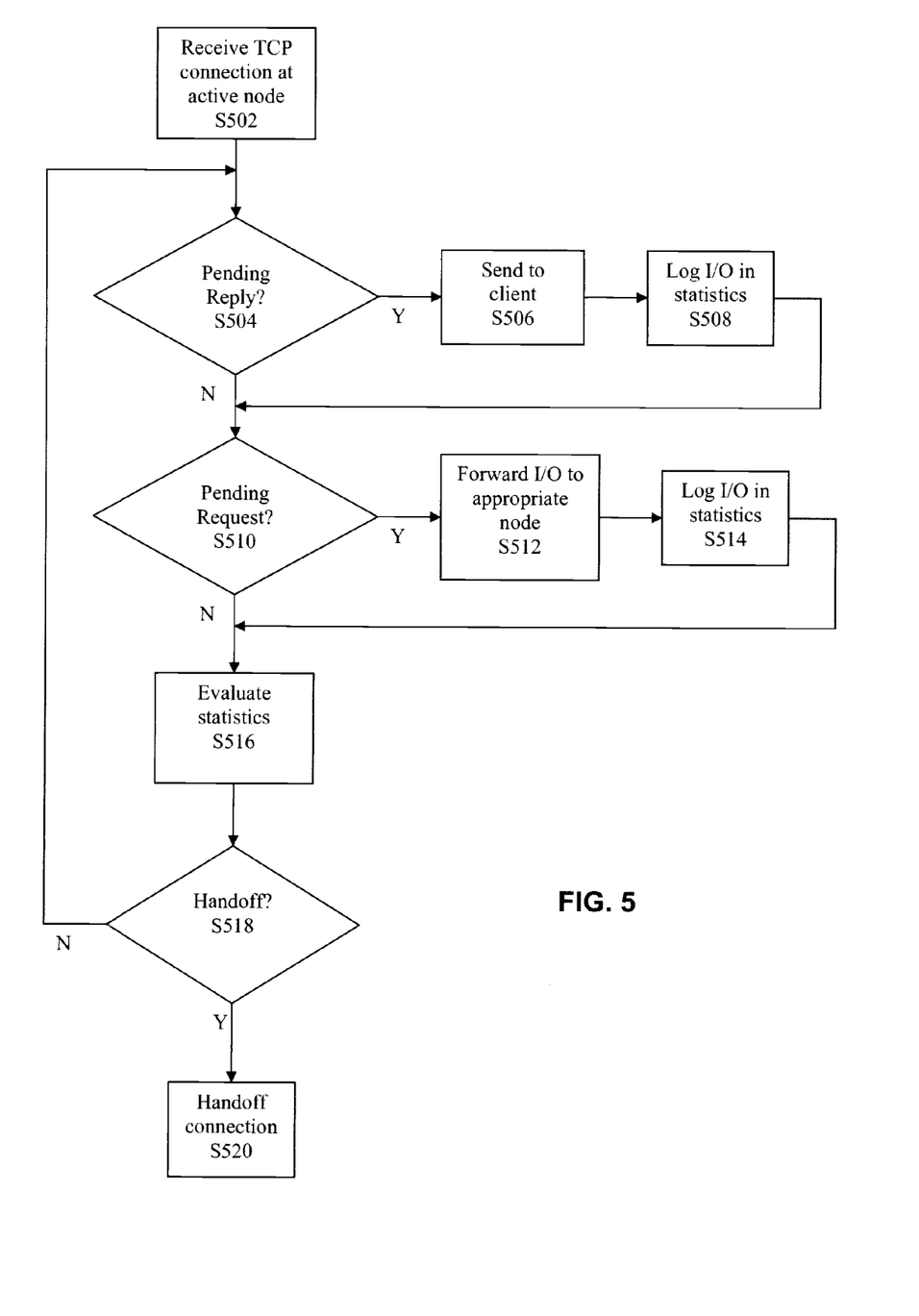
FIG. 5 is a flowchart illustrating one example I/O handling and connection migration methodology according to the invention.

An example methodology for handling I/O requests in accordance with this first aspect of the invention is illustrated in the flowchart in FIG. 5. As shown in this example, a new TCP connection from a client 310 is received by an active node 332 of the cluster 330 in step S502. A TCP connection can only be active at one node 332 at a time, so all the other nodes are passive nodes in this instance.

In step S504, the active node checks whether it has any pending replies for this connection. This can include, for example, a response to a read I/O request that has been completed by this node since the last time the node checked. If there is a reply ready, then processing branches to step S506 where the reply is sent to the TCP client, and the statistics are updated in step S508.

In step S510, the active node checks whether there are any new pending I/O requests for this connection. For example, with NFS over TCP, each I/O request is a separate remote procedure call (RPC) with header/length marking mechanisms allowing the separate requests to be identified and parsed. Accordingly, if the active node in step S510 determines that an I/O request has been received and not yet processed, in step S512 the node that should handle it is identified in directory 406, and the request is immediately forwarded to that node (if it belongs to a node other than the currently active node). Techniques such as those described in co-pending U.S. application Ser. No. 11/365,474 can be used to determine which node should handle a request for data that is not already cached in the pool 340 of cluster 330 and updating directory 406.

The node to which the I/O is forwarded in step S512 (i.e. a currently passive node) can then begin to immediately handle the request including, for example, retrieving data from an appropriate storage server 302 and filling a queue associated with the request if necessary. It should be apparent that multiple requests in the connection can thereby be handled in parallel by different nodes, without one node having to wait for another node to complete a request. When the passive node has finished processing the request, it can generate a reply and place the reply in a deferred queue. It continually updates statistics 408 accordingly. This can be done in a variety of ways. For example, passive nodes can send messages to the active node via interconnect 316 with statistics updates. Alternatively, the active node and passive nodes can maintain separate statistics copies which they update individually, and the separate copies can be synchronized during handoff operations. When the passive receives the TCP connection, it can then send the reply to the TCP client directly.

Returning to FIG. 5, in addition to forwarding the I/O to the appropriate node, in step S514 an entry for the I/O is also logged in statistics 408, along with the node(s) responsible for handling the request.

Next, processing advances to step S516 where handoff mechanism 404 evaluates statistics and then in step S518, the active node determines whether it is time to handoff the TCP connection, and if so, to which cluster node 332.

Statistics 408 include, for each active TCP connection handled by cluster 330, the physical node 332 that is handling each individual I/O request for that connection, as well as the progress of each request. A table for each connection such as that shown in FIG. 2 can be used to store the statistics. Statistics could also include the total number of requests pending/completed on each node, the number of read I/O requests pending/completed, the number of write I/O requests pending/completed, the age of pending requests or replies, the size of pending requests, etc. It should be apparent that many methods can be used to determine to which node a connection should be migrated based on any combinations of these possible statistics. In one of many possible examples, if the active node determines in step S518 that it has no pending requests or replies, and it determines that another node has several pending replies more than any other node, that node is identified as the next active node.

If it is determined in step S518 that the connection should be migrated, conventional techniques can then be used to transparently migrate the TCP connection to that node. That node then becomes the active node and this node becomes a passive node. Otherwise, processing for the connection by the active node returns to step S504.

According to additional aspects of the invention, I/Os performed as remote operations can co-exist on the same TCP connection as I/Os performed through TCP connection handoff. In these additional or alternative embodiments, for each incoming I/O, rather than just forwarding it to a node having queue data corresponding to the requests, the system can further decide whether the operation is better handled as a handoff or as remote operation. For example, an I/O with a large reply requirement is a better fit for a handoff operation, while an I/O with a very small reply requirement could be more efficiently done as a remote operation.

Figure 6:
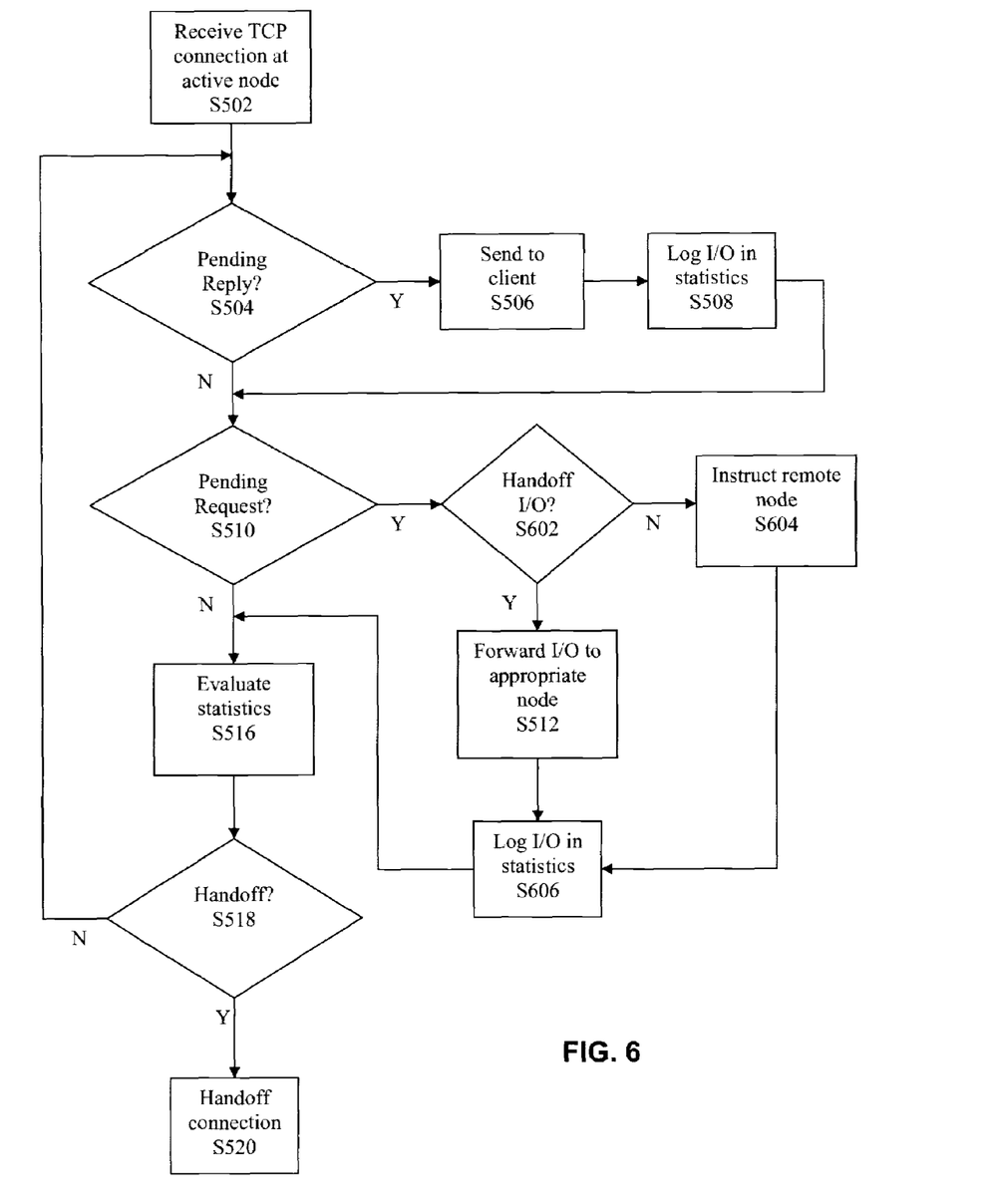
FIG. 6 is a flowchart illustrating another example I/O handling connection migration methodology according to the invention.

An example alternative methodology that can be implemented by mechanism 404 in this embodiment is illustrated in FIG. 6.

As shown in FIG. 6, all steps with the same numbering are performed similarly to the embodiment of FIG. 5. However, in this embodiment, if it is determined in step S510 that there is a new pending I/O request, a further determination is made in step S602. More particularly, contrary to the previous embodiment, each I/O is not automatically forwarded to an appropriate node to execute. Rather, in step S602, a determination is made whether or not to treat the I/O as a handoff or remote operation. Based on this determination, in step S512 only those I/Os that should be performed as a handoff operation are forwarded to the remote node, and the results are queued at that node as described above. Otherwise, in step S604 the remote node is instructed to send its results to the currently active node for the active node to queue and reply to the TCP client. Accordingly, the active node with the TCP connection communicates with the remote node and receives the data corresponding to the request via the interconnect 316, and the active node forwards the data to the client via the TCP connection. In this embodiment, therefore, replies for both kinds of operations (i.e. both remote and handoff operations) can be sent back to the same TCP client.

The determination of whether to treat an I/O operation as remote in step S608 can be made in various ways. For example, a threshold value can be set for the size of a required reply, and an I/O with a reply size greater than the threshold can be treated as a handoff operation, while an I/O with a reply size lower than the threshold can be treated as a remote operation.

Many alternative determinations are possible. For example, the type of operation can be considered (e.g. metadata operations can be treated as remote operations while non-metadata operations can be handoff operations). Or a more dynamic adaptation can be used, such as evaluating the number of handoff operations already outstanding to a node. If a node already has handoff operations pending or in process, it is determined that a connection migration will eventually be scheduled to that node, so new operations for that node can be converted to handoff operations rather than remote operations. As another alternative, distinctions between servers, clients and/or VIP can be used. For example, all requests to a particular server can be handled as remote operations. This may be a useful way to isolate types of workloads and pre-set a handoff/remote operation selection algorithm for them. Still further, latencies of previous handoff/remote operations of the same type can be considered. In this example, the system can learn which types of operations are better served as remote or handoff operations by trying out both and setting thresholds based on past response latencies.

In step S606, handoff I/Os are logged into statistics 408 as pending on the remote node, while I/Os performed via remote operations are logged as pending on the currently active node that received the I/O.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
   receiving a network connection at a first node of a storage cluster;
   receiving a first I/O request at the first node via the connection;
   processing the first I/O request at the first node;
   receiving a second I/O request at the first node via the connection;
   forwarding the second I/O request to a second node of the storage cluster;
   processing the second I/O request at the second node while maintaining the network connection at the first node; and
   migrating the connection to the second node after completing the processing of the first I/O request at the first node and after forwarding the second I/O request to the second node.

2. A method according to claim 1, further comprising:
   logging statistics corresponding to the first and second I/O requests; and
   determining when to migrate the connection to the second node based on an evaluation of the statistics.

3. A method according to claim 1, further comprising:
   maintaining a directory of data associated with the storage cluster; and
   identifying the second node using the directory.

4. A method according to claim 1, wherein the step of migrating the connection is performed transparently to a client associated with the connection.

5. A method according to claim 1, wherein the connection uses TCP.

6. A method according to claim 4, wherein the connection uses TCP.

7. A method according to claim 1, further comprising sending a reply to the first I/O request from the first node before migrating the connection.

8. A method according to claim 7, further comprising sending a reply to the second I/O request from the second node after migrating the connection.

9. A method comprising:
   receiving a network connection at a first node of a storage cluster;
   receiving a first I/O request at the first node via the connection;
   processing the first I/O request at the first node;
   receiving a second I/O request at the first node via the connection;
   determining whether to handoff the second I/O request to a second node of the storage cluster;
   if the determination is to handoff the second I/O request:
      processing the second I/O request at the second node, and
      migrating the connection to the second node after completing the processing of the first I/O request at the first node and after forwarding the second I/O request to the second node;
   if the determination is to not handoff the second I/O request:
      processing the second I/O request at the second node, and
      forwarding results of processing the second I/O request to the first node.

10. A method according to claim 9, further comprising:
   maintaining a directory of data associated with the storage cluster; and
   identifying the second node using the directory.

11. A method according to claim 9, wherein the step of migrating the connection is performed transparently to a client associated with the connection.

12. A method according to claim 9, wherein the connection uses TCP.

13. A method according to claim 11, wherein the connection uses TCP.

14. A storage apparatus comprising:
   a first node that receives a network connection and a first I/O request via the connection;
   a second node that processes a second I/O request received at the first node while maintaining the network connection at the first node; and
   a handoff mechanism that migrates the connection to the second node after processing of the first I/O request at the first node is completed and after processing of the second I/O request at the second node has started.

15. An apparatus according to claim 14, further comprising:
- statistics corresponding to the processing of the first and second I/O requests,
- wherein the handoff mechanism uses the statistics to determine when to migrate the connection to the second node.

16. An apparatus according to claim 14, further comprising:
- a directory of data associated with the storage cluster,
- wherein the second node is identified using the directory.

17. An apparatus according to claim 14, wherein the handoff mechanism is adapted to migrate the connection transparently to a client associated with the connection.

18. An apparatus according to claim 14, wherein the connection uses TCP.

19. An apparatus according to claim 17, wherein the connection uses TCP.

20. An apparatus according to claim 14, wherein the handoff mechanism is further adapted to determine whether to handoff the second I/O request to a second node of the storage cluster, and wherein if the determination is to handoff the second I/O request:
- the handoff mechanism causes the second I/O request to be processed at the second node, and migrates the connection to the second node after processing of the first I/O request at the first node is completed and after processing of the second I/O request at the second node has started;

and wherein if the determination is to not handoff the second I/O request:

the handoff mechanism causes the second I/O request to be processed at the second node, and further causes results of processing the second I/O request to be forwarded to the first node.

* * * * *